United States Patent [19]

Labedan et al.

[11] Patent Number: 4,655,618
[45] Date of Patent: Apr. 7, 1987

[54] NEEDLE BEARING AND IN PARTICULAR A NEEDLE SLEEVE HAVING A REINFORCED SEAL

[75] Inventors: Jean-Denis Labedan, Vierzon; Gerard Stéphan, Croissy-sur-Seine, both of France

[73] Assignee: Nadella, Vierzon, France

[21] Appl. No.: 759,649

[22] Filed: Jul. 26, 1985

[30] Foreign Application Priority Data

Jul. 30, 1984 [FR] France .................. 84 12083

[51] Int. Cl.$^4$ .................. F16C 33/76; F16J 9/06
[52] U.S. Cl. .................. 384/486; 384/564; 277/152; 277/205
[58] Field of Search .................. 277/152, 205; 384/130, 384/147, 151, 153, 477, 484–486, 488, 489, 564

[56] References Cited

U.S. PATENT DOCUMENTS

| | | | |
|---|---|---|---|
| 3,404,926 | 10/1968 | Horne | 384/564 |
| 3,658,395 | 4/1972 | Hallerback | 384/484 |
| 4,162,110 | 7/1979 | Gardella | 384/484 |
| 4,285,526 | 8/1981 | Klinteberg et al. | 384/477 X |

FOREIGN PATENT DOCUMENTS

| | | | |
|---|---|---|---|
| 250392 | 4/1963 | Australia | 384/477 |
| 1942659 | 3/1970 | Fed. Rep. of Germany | |
| 2506869 | 12/1982 | France | |
| 2130310 | 5/1984 | United Kingdom | 384/486 |

Primary Examiner—Stuart S. Levy
Assistant Examiner—David Werner
Attorney, Agent, or Firm—Robert E. Burns; Emmanuel J. Lobato; Bruce L. Adams

[57] ABSTRACT

A needle bearing, and in particular a needle sleeve, comprising an outer ring (1) in which are mounted needles (2) contained in a cage (3), sealing means being provided at the ends of the outer ring, wherein said sealing means comprise a sealing element (11) of an elastomer having a sleeve (12) adapted to receive by a tight fit the inner element (4) of the bearing, and peripheral sealing lips (13, 14, 15) cooperative with the axial surfaces of a flange (5) having an axial ledge (6, 7, 8, 10) of the outer ring in which the sealing element (11) is disposed, an axial inner portion (10) of the flange constituting an abutment for the axial relative displacements of the outer ring (1) and the inner element (4) of the bearing.

7 Claims, 3 Drawing Figures

NEEDLE BEARING AND IN PARTICULAR A NEEDLE SLEEVE HAVING A REINFORCED SEAL

The present invention relates to needle bearings and more particularly to needle sleeves having a reinforced seal.

A needle sleeve is usually formed by a ring arrangement of needles disposed in a cage and mounted in a sleeve whose inner surface forms the outer rolling track or race of the assembly.

A shaft is rotatively mounted within the ring arrangement of needles.

There are sealing problems in such a needle sleeve at the ends of the sleeve forming the outer rolling track, above all in certain applications in which the shaft moreover undergoes an axial movement of small extent, for example on the order of 1 to 2 mm.

An object of the invention is to provide a needle sleeve provided with efficient sealing means, even when the sleeve or outer ring and the shaft undergo relative axial movements.

The invention therefore provides a needle bearing, and in particular a needle sleeve, comprising an outer ring in which rolling elements are mounted, sealing means being provided at at least one end of the outer ring, wherein said sealing means comprises a sealing element of an elastomer including a sleeve portion adapted to receive by a press fit the inner element of the bearing, and peripheral sealing lips cooperative with the axial surfaces of a flange an attached member having an outer axial ledge associated with the outer ring and in which said sealing element is disposed, an axial inner ledge of said attached member constituting an abutment limiting relative axial displacements of the outer ring and the inner element of the bearing.

A better understanding of the invention will be given by the following description which is given solely by way of example with reference to the accompanying drawings, in which.

Figure 1:
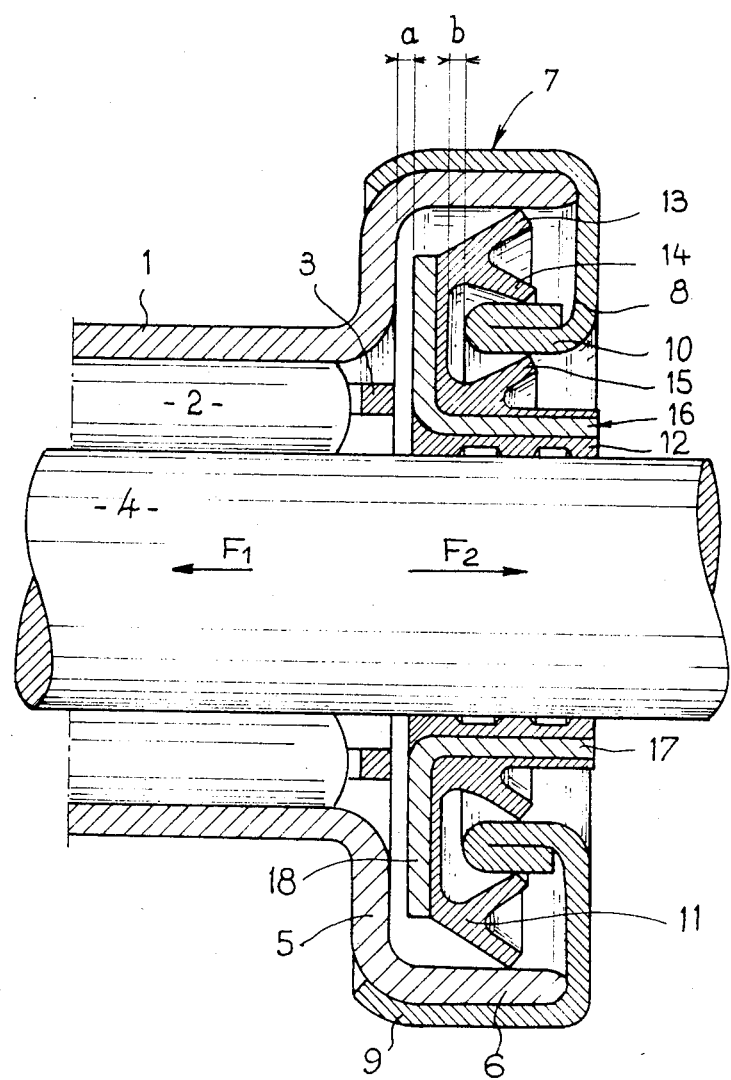
FIG. 1 is a partial elevational and sectional view of a needle sleeve according to a first embodiment of the invention.

The needle sleeve shown in FIG. 1 comprises an outer ring 1 in which is mounted a ring arrangement of needles 2 disposed in a cage 3. The ring arrangement of needles may also be formed by adjoining needles without a cage.

The inner surface of the ring constitutes the outer rolling track or race for the needles 2 and an inner element of the bearing or a shaft 4 is rotatively mounted within the ring arrangement of needles.

The shaft 4 undergoes furthermore an axial movement of small extent, for example, on the order of 1 to 2 mm.

At one of its ends, the outer ring 1 has a flange 5 including an axial ledge or an annular wall 6 which extends axially beyond the needles 2 and the cage 3.

Fixed on the axial ledge 6 by a forming-over method is an attached annular member 7 provided with a radial ring-shaped portion 8, an outer axial portion 9 by which it is fixed to the ledge 6 of the flange 5 and an inner axial portion or an axially extending ledge 10 having an end portion which is formed-over onto itself.

In the spaces defined between the axial ledge 6 of the flange 5 and the inner axial portion 10 of the attached member 7, on one hand, and between this axial portion 10 and the shaft 4, on the other hand, there is interposed a sealing element 11.

This sealing element 11 comprises an elastomer part provided with a central sleeve 12 mounted with a tight fit on the shaft 4 and three axial peripheral sealing lips 13, 14 and 15 which are respectively in contact with the inner surface of the axial ledge 6 of the flange 5, the outer surface of the inner axial portion 10 of the attached member 7 and the inner surface of this inner portion 10.

The triple seal is reinforced by a reinforcement 16 formed by a tube 17, embedded in the material of the elastomer sleeve 12, and a radial flange 18.

The reinforcement 16 is fixed to the sealing element by, for example, bonding or vulcanization.

In operation, the sealing element is immobilized relative to the shaft 4 by the gripping of the elastomer sleeve 12.

The possibility of axial displacement of the assembly thus defined is equal to the sum of the distances a and b respectively between the flange 5 of the sleeve 1 and the surface of the flange 18 of the reinforcement 16 in confronting relation to the flange 5 and between the opposed surface of the flange 18 and the end of the axial inner portion 10 of the attached member 7.

When the shaft 4 is inserted in the bearing, the whole of the sealing element is driven by the gripping of the sleeve 12. If the insertion of this shaft occurs in the direction of the arrow $F_1$, the sealing element abuts by its flange against the flange 5 of the sleeve 1.

If the insertion occurs in the direction of the arrow $F_2$, the sealing element 11 abuts by its radial portion against the end of the axial inner portion 10 of the attached member 7.

Thus it can be seen that, irrespective of the direction of insertion of the shaft in the bearing, the sealing lips 13, 14 and 15 are not liable to be damaged during the assembly.

Figure 2:
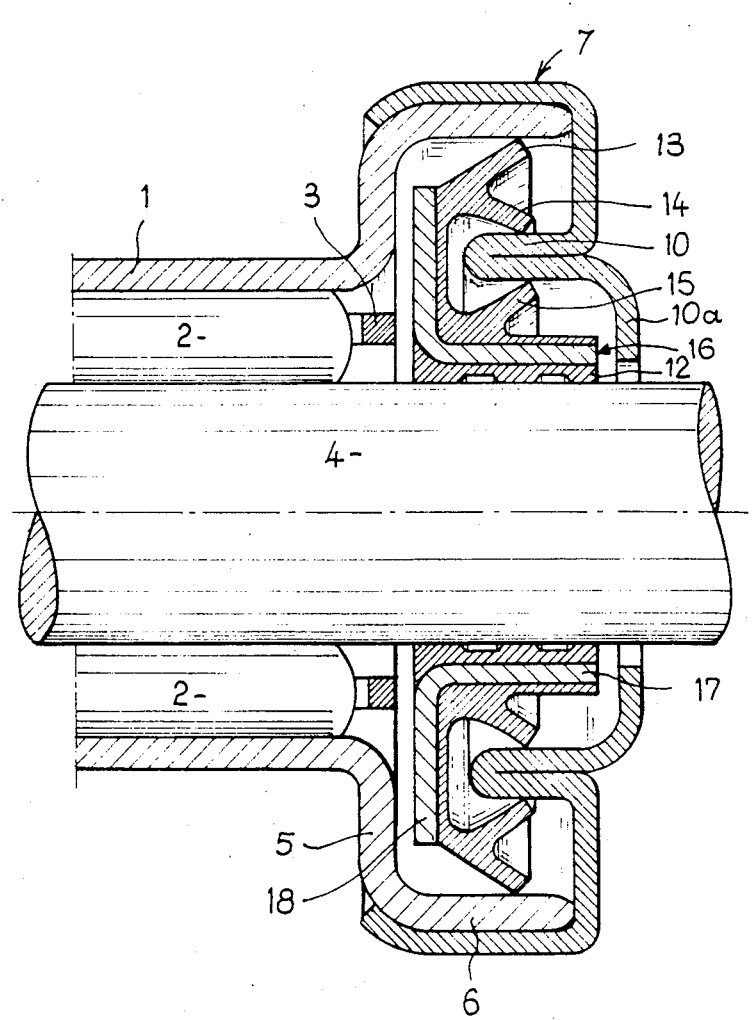
FIG. 2 is partial elevational and sectional view of a second embodiment of the needle sleeve according to the invention.

FIG. 2 shows a needle sleeve which constitutes a modification of the needle sleeve shown in FIG. 1.

According to this modification, which is substantially similar in every respect to the sleeve shown in FIG. 1, the attached member 7 includes a radial portion 10a extending from the axial inner portion 10 and constituting a deflector protecting the assembly against projections of soiling elements.

It will be seen that the arrangement just described permits the obtainment of a needle bearing which combines a good seal with a tolerance of axial displacement of the shaft relative to the outer ring with no danger of damage to the sealing means.

The embodiments described with reference to FIGS. 1 and 2 are rolling bearings whose outer ring and attached member are made by a press operation.

The invention is also applicable to massive rolling bearings.

Figure 3:
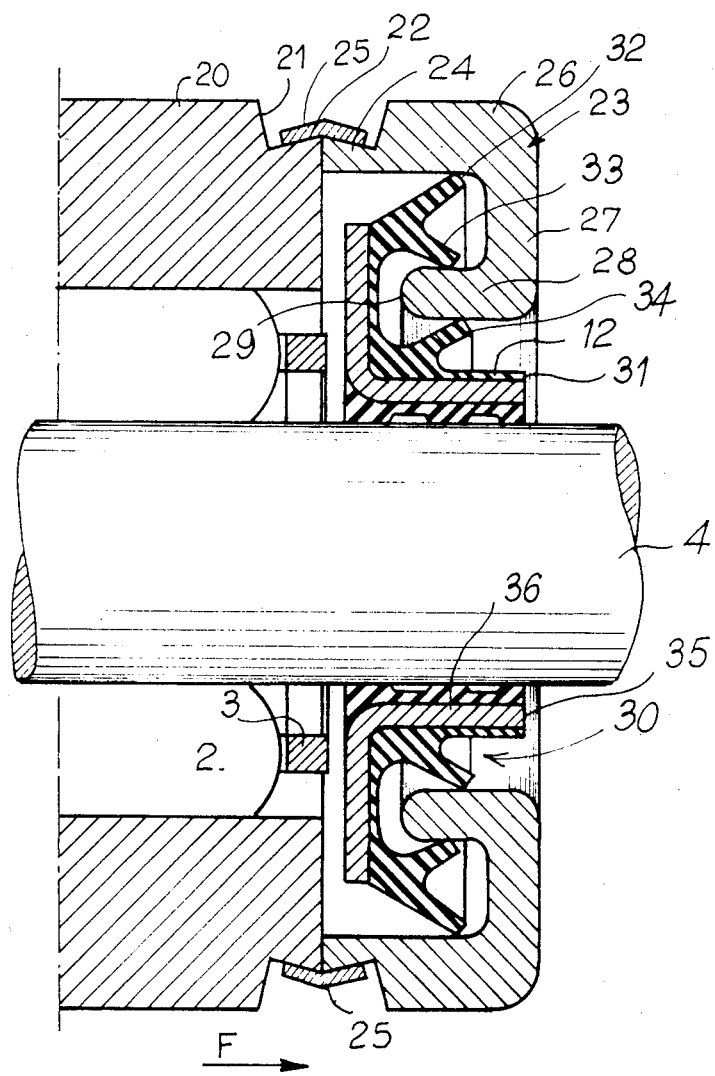
FIG. 3 is a partial elevational and sectional view of an embodiment comprising machined parts of the needle sleeve according to the invention.

The needle sleeve shown in FIG. 3 differs from the embodiments described with reference to FIGS. 1 and 2 in that it includes a massive outer ring 20 at at least one of the ends of which is formed by machining a groove defining a frustoconical edge portion 22 whose large base defines the corresponding end of the sleeve. The edge portion 22 is extended by an attached annular member 23 which is also massive and also includes a frustoconical edge portion 24 whose large base is applied against the large base of the edge portion 22 of the ring 20.

The two edge portions 22 and 24 are interconnected by a setting or forming-over of an assembly collar 25.

The annular member 23 includes an axial outer portion 26 which lies in the extension of the outer ring 20 and defines the annular wall, a radial portion 27 and an inner axial portion 28 whose inwardly facing end 29 forms an abutment for the axial displacements in the direction of arrow F of the outer ring relative to the shaft 4 on which it is mounted.

In the spaces defined between the outer and inner portions 26 and 28 of the annular member 23, on one hand, and the inner portion of this member and the shaft 4, on the other hand, there is interposed a sealing element 30 of an elastomer similar to the sealing elements described with reference to FIGS. 1 and 2 and including a central sleeve 31 mounted with a tight fit on the shaft 4 and three axial peripheral lips 32, 33, 34 which are respectively in contact with the inner surface of the outer portion 26, with the outer surface of the inner axial portion 28, and with the inner surface of the inner axial portion 28 of the member 23.

As in the foregoing embodiments, this triple seal is reinforced by a reinforcement 35 consisting of a tubular portion 36 embedded in the material of the sleeve 31 of elastomer and a radial flange 37, the reinforcement being fixed to the sealing element by bonding or vulcanization.

We claim:

1. A needle bearing comprising: an outer ring, needles mounted in the outer ring, an inner element rotatably mounted in the outer ring and surrounded by the needles, and sealing means disposed at at least one end of the outer ring, said sealing means comprising means defining an annular wall disposed at the end of the outer ring and having an axially extending annular inner surface, an attached member radially and inwardly extending from said annular wall and having at a radially inner end of the attached member an axially extending ledge defining inner and outer axially extending surfaces, and a sealing element composed of an elastomer and including a sleeve portion adapted to receive the inner element of the bearing with a tight fit, the sealing element having three peripheral sealing lips disposed around the sleeve portion, each being in contact with the axially extending annular inner surface of the annular wall, the outer axially extending surface of the ledge and the inner axially extending surface of the ledge respectively, said sealing element being disposed against the ledge, said ledge constituting an abutment for relative axial displacements between the outer ring and said inner element of the bearing.

2. A needle bearing according to claim 1, wherein the attached member defines said axially extending ledge and has an outer axially extending portion which is fixed to the end of the outer ring.

3. A needle bearing according to claim 2, wherein the attached member further comprises a radially extending portion extending from the inner axially extending ledge thereof and constituting a deflector.

4. A needle bearing according to claim 1, wherein the sealing element comprises a reinforcement having a tubular portion embedded in the elastomer of said sleeve of the sealing element and a radial flange supporting the peripheral sealing lips of the sealing element, the reinforcement being fixed to said elastomer of the sealing element by bonding or vulcanization.

5. A needle bearing according to claim 2, wherein the end portion of said outer ring defining a flange and said attached member comprise press-formed elements, said flange defining the annular wall.

6. A needle bearing according to claim 2, wherein the outer ring and the attached member comprise machined massive parts, the outer axially extending portion of the attached member defining the annular wall.

7. A needle bearing according to claim 6, wherein each of the massive parts comprises a frustoconical edge portion having a large base which constitutes the end of the corresponding part, the edge portion of said attached member being disposed in the extension of the edge portion of said outer ring, and a formed-over assembly collar interconnecting said outer ring and said attached member by surrounding said two frustoconical edge portions.

* * * * *